F. O. WELLS & F. JUDGE.
THREAD GAGE.
APPLICATION FILED JAN. 24, 1913.

1,130,866.

Patented Mar. 9, 1915.

WITNESSES:
R. M. Mowry
W. P. Noble

INVENTORS
Frank O. Wells
Franklin Judge
BY Chapin & Co.
ATTORNEY.

THE NORRIS PETERS CO., WASHINGTON, D. C.

UNITED STATES PATENT OFFICE.

FRANK O. WELLS AND FRANKLIN JUDGE, OF GREENFIELD, MASSACHUSETTS, ASSIGNORS TO GREENFIELD TAP & DIE CORPORATION, OF GREENFIELD, MASSACHUSETTS, A CORPORATION OF MASSACHUSETTS.

THREAD-GAGE.

1,130,866.  Specification of Letters Patent.  Patented Mar. 9, 1915.

Application filed January 24, 1913. Serial No. 743,884.

*To all whom it may concern:*

Be it known that we, FRANK O. WELLS and FRANKLIN JUDGE, both citizens of the United States of America, residing at Greenfield, in the county of Franklin and State of Massachusetts, have invented new and useful Improvements in Thread-Gages, of which the following is a specification.

This invention relates to improvements in thread gages and more specifically to gages by means of which the size of screws may be accurately determined.

The object of the invention is to provide a thread gage, which is arranged to be correctly adjusted by comparison with a standard gage, whereby the size of screws may be accurately measured.

In practice a single standard gage is used in a shop as a means for setting the thread gages given to the workman. This standard gage is one which has been measured by and certified to by the Bureau of Standards and is kept ordinarily in the office safe for use as a reference gage. The thread gages given to the workman for the measurement of screws, are frequently compared with and set by this standard.

Figure 1:
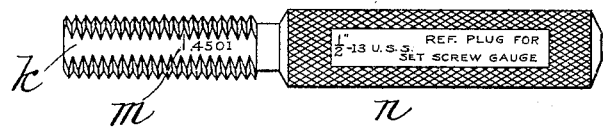
Figure 2:
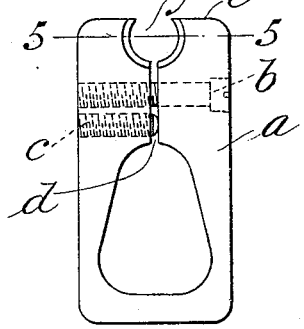
Figure 3:
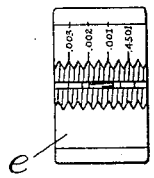
Figure 4:
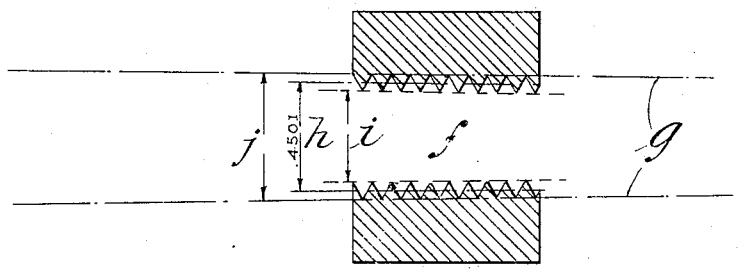

A preferred embodiment of my invention is shown for the purposes of illustration in the accompanying drawings in which:

Figure 1 is a side elevational view of the reference plug gage which has been standardized by some bureau organized for that purpose; Fig. 2 is an end elevational view of the thread gage, which is arranged to be set to the correct size by the reference plug shown in Fig. 1; Fig. 3 is a top plan view of Fig. 2 showing a flattened surface provided with suitable graduations whereby the size of screws may be measured; Fig. 4 is a sectional view taken on the line 5—5 of Fig. 2 which is drawn to an enlarged scale. In this view the root, pitch and outside diameter of the threads of the reference plug shown in Fig. 1, are indicated by dotted lines. Furthermore, the slight taper in the opening of the adjustable gage is clearly indicated by the pair of dotted lines which are extended to show the convergence therebetween.

Referring to the drawings in detail: $a$ designates an adjustable thread gage which is given to the workman after having been correctly set from the reference plug shown in Fig. 1. This gage is provided with two set screws $b$ and $c$ and a narrow opening $d$, which permits a slight spring action when the set screws $b$ and $c$ are operated. The upper surface of this gage $a$ is flattened, as shown at $e$, and $f$ indicates an opening in the upper portion of the gage, which results from the intersection of the surface $e$ with the threaded hole of the gage. The reference plug, indicated generally by the reference letter $n$, is formed with a flattened surface $k$. On the latter is a graduation $m$, which indicates the pitch diameter of the reference plug at that point. For the purposes of illustration, the plug $n$ and the gage $a$ have been shown as designed for a one half inch standard thread. The correct pitch diameter of a thread of this size is .4501 which numeral is indicated at the graduation $m$ in Fig. 1. The surface $e$ of the gage $a$ has a graduation marked .4501 and other graduations marked .001—, .002— and .003—. The latter are placed at intervals of two threads from the graduation .4501 and indicate a progressive reduction of diameter of the screw to be measured in a manner to be described.

Fig. 4 clearly shows by the converging dotted lines $g$ the taper of the gage $a$. These lines $g$ are drawn through the roots of the thread on the gage $a$ and the dimension $f$, between these lines, indicates the outside diameter of the plug $n$. The pitch and root diameters of the plug are indicated by the dimensions $h$ and $i$ respectively. The taper of the opening in the gage $a$, as will be observed from Fig. 3 is at the rate of one one thousandth of an inch to a linear distance equal to two threads.

The gage $a$ is first correctly set from the reference plug $n$. The plug $n$ is screwed into the threaded opening of the gage until the graduation $m$ registers with the graduation .4501 on the gage $a$. The set screws $b$ and $c$ of the gage $a$ are then adjusted so that there is an accurate fit between the reference plug and the threaded opening in the gage. After this adjustment has been made the plug $n$ is removed from the gage and the latter is given to the workman for the measurement of screws.

The manner, in which screws are measured will now be described. In practice, the measurement of a screw is taken on the sixth thread from the end. The pitch diameter at the sixth thread from the end must equal the correct pitch diameter .4501. Thus a screw of correct size, when threaded into the opening of the gage $a$, would have its sixth thread opposite the graduation marked .4501. If the sixth thread of the screw failed to reach this graduation, the screw is oversize and if it passes the graduation it is undersize. The amount of variation from the correct size is indicated by the graduations and might readily be determined without these graduations since two threads represent a variation of one one thousandth of an inch in pitch diameter. If when a screw is threaded into the opening of the gage $a$, the sixth thread thereof lies opposite the graduation marked .001—it is undersize in pitch diameter by one one thousandth of an inch. Similarly, the other graduations to the left of the mark .4501 indicate variations of two and three one thousandths of an inch below the required pitch diameter. If the sixth thread fails to reach the mark .4501 the amount of oversize may be estimated by counting the number of threads between the mark on the gage and the sixth thread from the end of the screw, remembering that two threads represent one one thousandth of an inch in pitch diameter. Variations of less than one one thousandth of an inch may be easily determined by a skilled operator by counting threads and half threads. It is thus very easy to determine a deviation of one quarter of one thousandth of an inch in pitch diameter. Obviously, the gage $a$ also gives a check on the pitch of the screw, for if the screw and gage were of different pitch the former could not enter the opening of the gage $a$ any appreciable distance. Thus, I have provided a simple and accurate gage, by means of which a workman may measure screws in the manner described. This gage is arranged to be adjusted and set from a standard reference plug, whereby it is standardized. Gages have heretofore been used, which measure the size of a screw, but so far as I am aware, no gage has been provided, which indicates the amount of variation in the diameter thereof.

What we claim is:

1. A thread gage comprising in combination, a body member formed with a tapered threaded opening therein, arranged to receive a screw to be measured, said body being provided with a flattened upper portion having a graduation thereon to indicate the correct size of said screw and other graduations to indicate deviations from said correct size, said flattened upper portion intersecting the threaded opening, means to set the gage from a standard reference plug, all constructed and arranged so that the size of the screw to be measured is indicated by the distance said screw can be turned into said opening.

2. A thread-gage formed with a tapered threaded opening in the upper portion thereof, and an enlarged opening communicating therewith, the upper end of the gage being flattened and intersecting said opening, said surface being provided with numerals designating the fractional parts of an inch, whereby when a tap is threaded into said opening, the correct size of the inserted tap may be determined, means for adjusting the diameter of the tapered threaded opening, said means comprising set-screws for adjusting said first mentioned opening.

FRANK O. WELLS.
FRANKLIN JUDGE.

Witnesses:
CHARLES N. STODDARD,
ROBERT O. MILLER.

Copies of this patent may be obtained for five cents each, by addressing the "Commissioner of Patents, Washington, D. C."